US008762401B2

(12) United States Patent  
Waggoner

(10) Patent No.: US 8,762,401 B2
(45) Date of Patent: Jun. 24, 2014

(54) SYSTEM AND METHOD FOR AUTOMATED DATA RETRIEVAL BASED ON DATA PLACED IN CLIPBOARD MEMORY

(75) Inventor: Steven E. Waggoner, Alpharetta, GA (US)

(73) Assignee: International Business Machines Corporation, Armonk, NY (US)

(*) Notice: Subject to any disclaimer, the term of this patent is extended or adjusted under 35 U.S.C. 154(b) by 238 days.

(21) Appl. No.: 12/753,240

(22) Filed: Apr. 2, 2010

(65) Prior Publication Data

US 2010/0192221 A1    Jul. 29, 2010

Related U.S. Application Data

(63) Continuation of application No. 11/152,515, filed on Jun. 14, 2005, now Pat. No. 7,725,476.

(51) Int. Cl.
*G06F 7/00* (2006.01)
*G06F 17/30* (2006.01)

(52) U.S. Cl.
CPC .................. *G06F 17/30392* (2013.01)
USPC ............... 707/758; 707/736; 707/769

(58) Field of Classification Search
CPC ... G06F 9/543; G06F 9/544; G06F 17/30392; G06F 17/30011
USPC .......................... 707/736, 758, 769
See application file for complete search history.

(56) References Cited

U.S. PATENT DOCUMENTS

| 5,301,268 | A | * | 4/1994 | Takeda ...................... 719/329 |
| 5,392,386 | A | * | 2/1995 | Chalas ....................... 715/841 |
| 5,835,722 | A | * | 11/1998 | Bradshaw et al. ........... 709/225 |
| 5,875,417 | A | * | 2/1999 | Golden ....................... 702/150 |
| 6,119,126 | A | * | 9/2000 | Yee et al. ......................... 1/1 |
| 6,202,100 | B1 | * | 3/2001 | Maltby et al. ............... 719/329 |
| 6,260,044 | B1 | * | 7/2001 | Nagral et al. ............... 707/697 |
| 6,564,254 | B1 | * | 5/2003 | Shoji et al. ................. 709/217 |
| 2002/0099685 | A1 | * | 7/2002 | Takano et al. ................. 707/1 |
| 2002/0138653 | A1 | * | 9/2002 | Ogura ......................... 709/246 |
| 2002/0156708 | A1 | * | 10/2002 | Ronen ........................... 705/35 |
| 2003/0182388 | A1 | * | 9/2003 | Alexander et al. ........... 709/213 |
| 2003/0200459 | A1 | * | 10/2003 | Seeman ...................... 713/200 |
| 2005/0172241 | A1 | * | 8/2005 | Daniels et al. .............. 715/770 |
| 2005/0278644 | A1 | * | 12/2005 | Greaves et al. .............. 715/760 |
| 2007/0011749 | A1 | * | 1/2007 | Allison et al. ................. 726/26 |

* cited by examiner

*Primary Examiner* — Cheyne D Ly
(74) *Attorney, Agent, or Firm* — Schmeiser Olsen & Watts LLP

(57) ABSTRACT

A data retrieval system and method of the invention provide automatic retrieval of information based on data placed into, for example, a Windows™ clipboard. A user highlights and cuts (or pastes) data into the clipboard during execution of an application program. A data retriever program periodically reads the clipboard to determine whether new data has been placed therein. Upon finding new data in the clipboard, the data retriever program determines whether the data or a variation thereof satisfies a predetermined criterion. If the criterion is satisfied, the data retriever program initiates a data-retrieval operation, such as a Web-based search, based on the data. If the criterion is not satisfied, the data retriever program does not perform any data-retrieval action. The data retrieval program does not interfere with the clipboard; any application program sharing the clipboard can use data placed therein, e.g., by a paste operation.

21 Claims, 3 Drawing Sheets

SYSTEM AND METHOD FOR AUTOMATED DATA RETRIEVAL BASED ON DATA PLACED IN CLIPBOARD MEMORY

RELATED APPLICATION

This application is a continuation application of co-pending U.S. patent application Ser. No. 11/152,515, filed Jun. 14, 2005, titled "System and Method for Automated Data Retrieval Based on Data Placed in Clipboard Memory", the entirety of which application is incorporated by reference herein.

FIELD OF THE INVENTION

The invention relates generally to end-user computer systems. More specifically, the invention relates to a system and method for automated data retrieval based on data placed in clipboard memory.

BACKGROUND

Users of computing devices have at their disposal myriads of application programs for performing untold varieties of tasks. Often a user who is working with one application program finds he needs certain information unavailable to the currently running application program in order to continue his work. To obtain this information, the user usually needs to suspend work in the current application program and run a second application program for the specific purpose of obtaining the desired information. In addition to being inconvenient, this practice can be considerably inefficient, and the inefficiency can increase when the user needs to repeat the practice frequently throughout the day.

Consider, for example, a user who responds to email from clients or customers who are inquiring about a claim related to their insurance policy. In order to respond to one email, the user may realize he needs to review the actual record of the claim, which is stored in a database. To review the record, the user runs an application program that accesses the database. To obtain the particular record, the user then supplies the application program with an identifier, such as a policy number, claim number, account number, etc, that the application program can use to search the database. Even before submitting the identifier, the user may need to supply a username and password to gain access to the database. After the database returns the sought-for record, then the user can return to the email application with the obtained information and prepare a response to the customer who submitted the inquiry. If repeated often, this practice becomes bothersome and inefficient. Thus, there is a need for system and method for retrieving information that can avoid the inconvenience and inefficiency of the present practice described above.

SUMMARY

In one aspect, the invention features a computer program product for retrieving information. The computer program product comprises a computer readable storage medium having computer readable program code embodied therewith. The computer readable program code comprising computer readable program code configured to make a predetermined association between a test string and execution of an application program that performs a data-retrieval operation; computer readable program code configured to recognize new data written to a shared memory buffer; computer readable program code configured to determine whether the new data written to the memory buffer satisfies the test string; computer readable program code configured to execute the application program that performs a data-retrieval operation in response to the new data written to the memory buffer satisfying the test string; and computer readable program code configured to retrieve data from a database in response to executing the application program that performs a data-retrieval operation.

In another aspect, the invention features a system for retrieving information. The system comprises memory including a shared memory buffer. The memory stores computer readable program code corresponding to a data-retrieval program and computer readable program code corresponding to an application program that performs a search of a database. A processor runs the data-retrieval program to make a predetermined association between a test string and execution of the application program that performs a search of a database, to recognize new data written to the shared memory buffer, to determine whether the new data written to the memory buffer satisfies the test string, to execute the application program that performs a search of a database in response to the new data written to the memory buffer satisfying the test string, and to retrieve data from the database in response to executing the application program.

In still another aspect, the invention features a method for retrieving information. A predetermined association is made between a test string and execution of an application program that performs a data-retrieval operation. New data written to a shared memory buffer are recognized and determined whether they satisfy the test string. The application program that performs a data-retrieval operation is executed in response to the new data written to the memory buffer satisfying the test string. Data are retrieved from a database in response to executing the application program that performs a data-retrieval operation.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The present invention features a data retrieval system and method for automatically retrieving information based on data placed into a clipboard memory. The clipboard is an embodiment of a memory buffer shared by a plurality of application programs. During execution of an application program, a user highlights and cuts (or pastes) data into the clipboard. In accordance with the invention, a data retriever program periodically reads the clipboard to determine whether new data has been placed therein. Upon finding new data in the clipboard, the data retriever program determines whether the data or a variation thereof satisfies a predetermined criterion. If the criterion is satisfied, the data retriever program causes execution of an application program appropriate for performing a data-retrieval operation based on the data. Execution of this application program causes display of any retrieved data. If the criterion is not satisfied, the data retriever program does not take any data-retrieval action. Regardless of whether the data satisfy the criterion, the data retriever program does not interfere with the operation of or data placed in the clipboard; any application program that shares the clipboard can still use the data placed therein.

Figure 1:
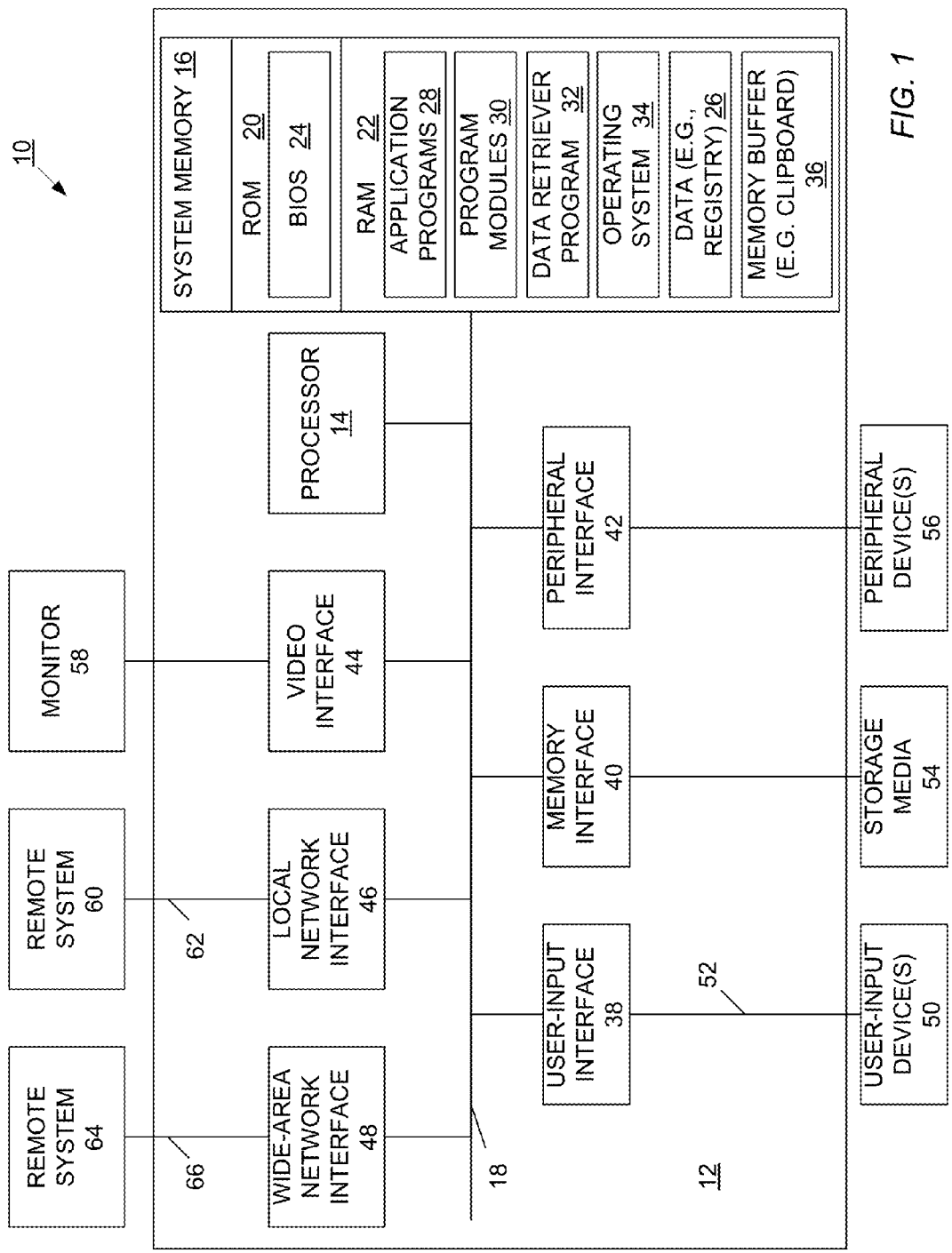
FIG. 1 is a block diagram of an exemplary computing environment in which aspects of the invention may be implemented.

FIG. 1 shows an example of a computing environment 10 within which an automatic data retrieval system of the present invention may be implemented. The computing environment 10 includes a computing device 12 having a processor 14 in communication with system memory 16 over a system bus 18. Exemplary embodiments of the computing device 12 include, but are not limited to, a personal computer (PC), a Macintosh computer, a workstation, a laptop computer, a hand-held device such as a personal digital assistant (PDA) and a cellular phone, and a network terminal.

The system memory 16 includes non-volatile computer storage media, such as read-only memory (ROM) 20, and volatile computer storage media, such as random-access memory (RAM) 22. Typically stored in the ROM 20 is a basic input/output system (BIOS) 24, which contains program code for controlling basic operations of the computing device 12, including start-up of the computing device and initialization of hardware. Stored within the RAM 22 are program code and data 26. Program code includes, but is not limited to, application programs 28, program modules 30, a data retriever program 32, and an operating system 34 (e.g., Windows 95, Windows 98, Windows NT 4.0, Windows XP, Windows 2000, and Macintosh). In one embodiment, the data 26 includes a registry, which is a database that stores hardware and software configuration, user preferences, and setup information for the computing device. The registry can store, e.g., the username and password required during the execution of a particular application program 28 or for accessing a local or remote data store or database. Such information can be stored in encrypted form to prevent a viewer of the registry from learning this information.

Application programs 28 on the computing device 12 include, but are not limited to, an electronic mail client program, browser software, an instant messaging program, and office applications, such as a spreadsheet, a word processor, and slide presentation software. Each application program 28 can be a proprietary or commercially available program, such as Lotus NOTES™ for email, Lotus Same Time™ for instant messaging, Microsoft Internet Explorer™ for browser software, and Microsoft WORD™ for word processing. The browser software can incorporate a JAVA™ virtual machine for interpreting JAVA™ code (i.e., applets, scripts) and applications.

A portion of the RAM 22 serves as a clipboard 36. The clipboard 36 is a temporary storage buffer for storing various types of data, for example, text, graphics, sound, and video. Several of the application programs 28 share the clipboard 36, that is, data cut or copied to the clipboard 36 from one application program 28 can be copied (i.e., pasted) into another application program 28 from the clipboard 36. For example, Windows™ operating systems use the clipboard 36 to share the data among at least the Excel™, PowerPoint™, Word™, and Outlook™ application programs.

Typically, the clipboard 36 operates in the background, that is, data placed in the clipboard 36 are not visible to the user, although displaying the clipboard contents is a selectable optional feature of some application programs 28. In a preferred embodiment, the clipboard 36 holds a single unit of information (i.e., data cut or copied together). Each subsequent cut or copy of information from within an application program 28 (that shares the clipboard 36) overwrites the previous contents of the clipboard 36. Terminating execution of an application program 28 may erase the contents of the clipboard 36.

In general, the data retriever program 32 is in communication with the clipboard 36 to read periodically the clipboard contents and to perform an action based upon those contents, as described in more detail below. The data retriever program 32 can be written using any one of a variety of programming languages, including, but not limited to, Visual Basic.

The system bus 18 connects the processor 14 to various other components of the computing device 12, including a user-input interface 38, a memory interface 40, a peripheral interface 42, a video interface 44, a local network interface 46, and a wide-area network interface 48. Exemplary implementations of the system bus 18 include, but are not limited to, a Peripheral Component Interconnect (PCI) bus, an Industry Standard Architecture (ISA) bus, an Enhanced Industry Standard Architecture (EISA) bus, and a Video Electronics Standards Association (VESA) bus.

Over a wire or wireless link 52, the user-input interface 38 is in communication with one or more user-input devices 50, e.g., a keyboard, a mouse, trackball, touch-pad, touch-screen, microphone, joystick, by which a user can enter information and commands into the computing device 12. The memory interface 40 is in communication with removable and non-removable non-volatile storage media 54. Examples of removable and non-removable non-volatile storage media include, but are not limited to, hard disks, optical disks such as CD ROMs, magnetic diskettes, and flash memory cards. Peripheral devices 56, e.g., printers, speakers, scanners, connect to the system bus 18 through the peripheral interface 42 and a display monitor 58 connects to the system bus 18 through the video interface 44.

The computing device 12 can be part of a network environment. Examples of network environments include, but are not limited to, local-area networks (LAN), metro-area networks (MAN), and wide-area networks (WAN), such as the Internet or World Wide Web. For connecting to a remote system 60 on a LAN, the computing device 12 can use the local network interface 46 over a logical connection 62. To connect to a remote system 64 on a WAN, the computing device 12 can use the wide-area network interface 48 over a logical connection 66. Examples of remote systems 60, 64 include, but are not limited to, Web servers, e-mail servers, application servers, directory servers, instant messaging servers, routers, and personal computers. The computing device 12 can connect to the remote system 60, 64 through one of a variety of connections, such as standard telephone lines, digital subscriber line, LAN or WAN links (e.g., T1, T3), broadband connections (Frame Relay, ATM), and wireless connections (e.g., 802.11(a), 802.11(b), 802.11(g)).

Figure 2:
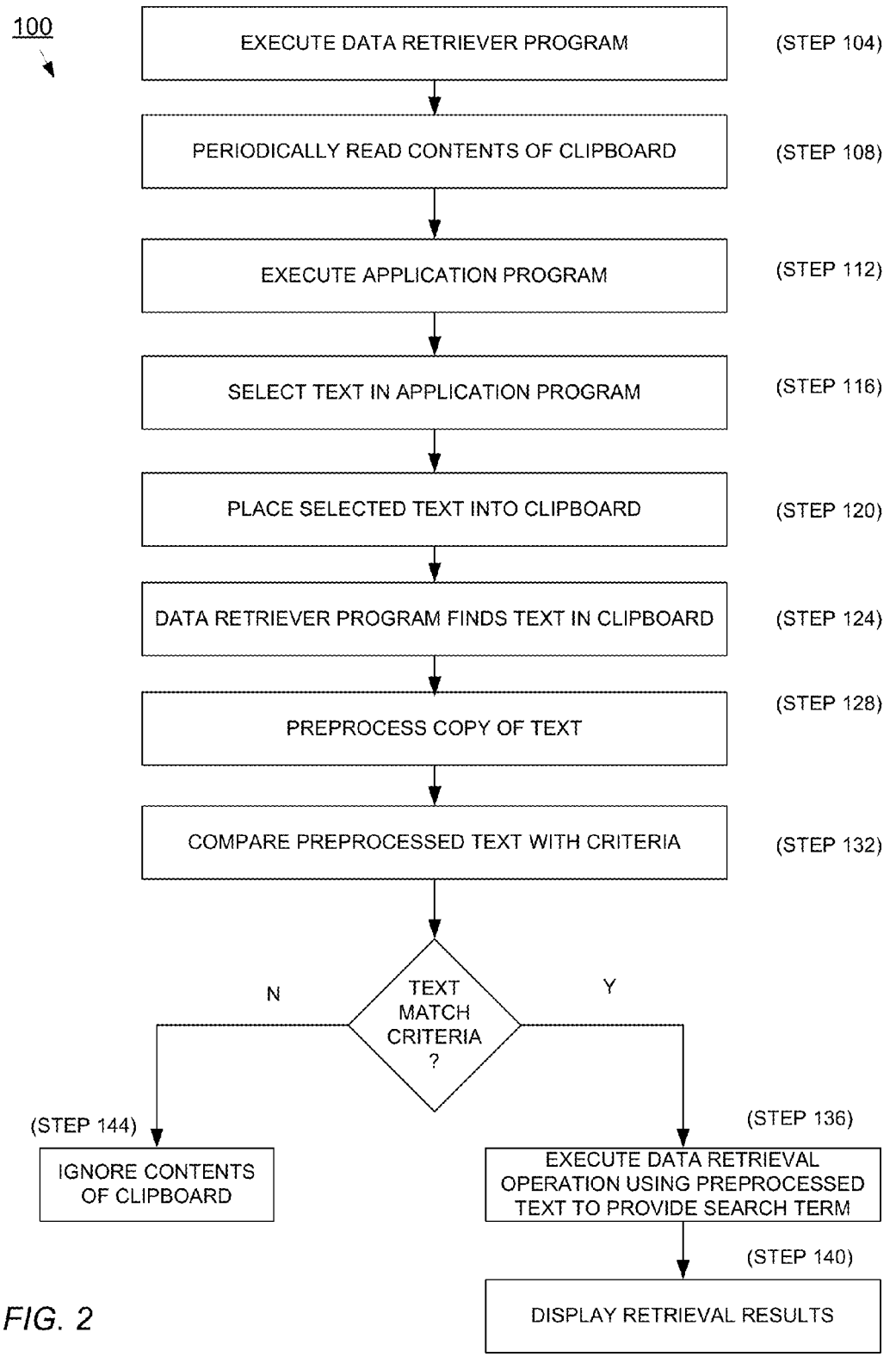
FIG. 2 is a flow diagram of an embodiment of a process for automatically retrieving information based on data placed into a clipboard.

FIG. 2 shows an embodiment of a process 100 for retrieving information based on data placed onto the clipboard 36. In describing the process 100, reference is also made to FIG. 1. The order of steps is exemplary; it is to be understood that one or more of the steps can occur in a different order than that shown.

At step 104, the processor 14 (FIG. 1) starts execution of the data retriever program 32. Configuration of the computing device 12 can cause the data retriever program 32 to start executing when the computing device 12 starts up. Alternatively, a user can deliberately launch the data retriever program at any time after start-up. The data retriever program 32 can run as a background process, unseen by a user of the computing device 12, or in the foreground (i.e., visible and, in one embodiment, presenting the user with a user interface). During execution, the data retriever program 32 reads (step 108) the contents of the clipboard 36. A timer function within the data retriever program 32 causes the reading of the clipboard 36 to occur periodically (e.g., every second).

At step 112, the user executes an application program 28, such as a word processor. During execution of the application program 28, the user selects (step 116) a portion of displayed text, e.g., by highlighting the text using an input-pointing device, such as a mouse. Then the user performs a cut or copy operation to place (step 120) the selected text portion into the clipboard 36. During the next read of the clipboard 36, the data retriever program 32 finds (step 124) the text portion and generates a copy thereof.

The copy of the text portion operates as a candidate string, i.e., a data string to be compared with certain criterion to determine whether a data retrieval operation is to take place. Program code of the data retriever program 32 parses (step 128) and, possibly, modifies the candidate string. This preprocessing can remove certain characters from or add certain characters (or both) to the candidate string in order to attempt to place the candidate string into a format tailored for making a comparison with predetermined criterion. Modification of the candidate string occurs in a separate memory; the contents of the clipboard 36 are unchanged by the manipulations of the candidate string by the data retriever program 32.

For example, the data retriever program 32 can remove spaces, dashes, and other non-alphanumeric characters from the candidate string in order to compare the candidate string with an alphanumeric test string (i.e., predetermined criterion). As another example, the data retriever program 32 may prepend or append certain characters to the candidate string. To illustrate by example, consider that the candidate string is a seven-digit number and the data retriever program 32 is designed to test for telephone numbers. Upon determining that the candidate string is a seven-digit number, the data retriever program 32 can prepend a default area code to the candidate string before comparing the candidate string with the test string. In addition, the data retriever program 32 can try a list of default area codes in order to find one that matches the test string. An objective of the preprocessing is to permit a degree of flexibility to the expression of the text portion as displayed in the application program 28.

At step 132, the data retriever program 32 compares the resulting preprocessed candidate string against predefined criteria (i.e., one or more test strings). The data retriever program 32 can employ various test strings in an attempt to find a match for the preprocessed candidate string. Each test string is associated with and tailored for a particular application program. The data retriever program 32 can be written to work with multiple application programs, with the multiple test strings corresponding to the same or to different ones of the application programs. The following exemplary pseudo-code illustrates, in an oversimplified manner, a relationship of test strings to application programs defined by the data retriever program. In this example, "candidate string" represents a copy (modified or unmodified) of the text portion placed in the clipboard and the test strings are "ABC", "DEF", "GHI", and "JKL".

```
if candidate_string = "ABC" {
    run application program "XYZ"
}
else if candidate_string = "DEF" {
    run application program "UVW"
}
else if candidate_string = "GHI" {
    run application program "RST"
}
else if candidate_string = "JKL" {
    run application program "RST"
}
else done
```

If the preprocessed candidate string matches one of the test strings, then the data retriever program 32 automatically initiates (step 136) a data retrieval operation, e.g., by launching execution of the application program associated with the matched test string, for retrieving information. The data retriever program 32 can be written so that the candidate string can match more than one test string, and consequently cause execution of more than one data retrieval operation based on the data placed in the clipboard.

When the criterion is matched, the data retriever program 32 can ask the user to choose whether to activate the data retrieval functionality. If the user does not select the data retrieval functionality provided by the data retriever program 32, application programs 28 can still use the standard cut-and-paste functionality of the clipboard 36. The data retriever program 32 can also ask the user to select which database is to be searched (e.g., choose between an archive or active database).

Upon executing the selected application program, the data retriever program 32 can supply the candidate string, modified or unmodified, as an input parameter. The input parameter serves to instruct the selected application program as to type of information to be retrieved (i.e., candidate string can serve as a search term). For example, the preprocessed candidate string may correspond to a tracking number for a package in transit, and a data store maintains records (e.g., the tracking status) of various packages. The data retriever program 32 supplies the tracking number to the selected application program, which uses the number as a search parameter with which to search the data store. In another embodiment, the data retriever program 32 can use the string to create or obtain a search parameter to be supplied to the application program (e.g., using the candidate string as an index to a lookup table).

In some embodiments, execution of the selected application program or access to the data store requires user authentication. Before launching the selected application program (in step 136), the data retriever program 32 can access the registry to obtain a username and password that are stored in the registry for this purpose. The data retriever program 32 then decrypts and submits the username and password to the selected application program as input parameters. At step 140, the selected application program obtains and displays the data satisfying the search term or terms.

If the data retriever program 32 finds no match for the preprocessed candidate string, then the contents of the clipboard 36, at step 144, are ignored. The information on the clipboard 36 remains undisturbed by the data retriever program 32, and thus remains available for use by other application programs that share the clipboard 36.

Because the data retriever program 32 periodically reads the contents of the clipboard 36, the data retriever program 32 can come across the same text portion on successive reads and consequently cause the same data to be retrieved. To prevent repetitious data-retrieval actions based on unchanged clipboard contents, the data retriever program 32 employs a flag. The data retriever program 32 sets the flag after reading the clipboard 36 contents for the first time. While the flag remains set, the data retriever program 32 does not perform a data retrieval operation based on the clipboard contents. The flag is reset when the user places new information on the clipboard 36 or the clipboard 36 is cleared of contents. Reset of the flag enables the data retriever program 32 to initiate data retrieval operations again based the contents of the clipboard, provided such contents satisfy the predetermined criterion.

Figure 3A:
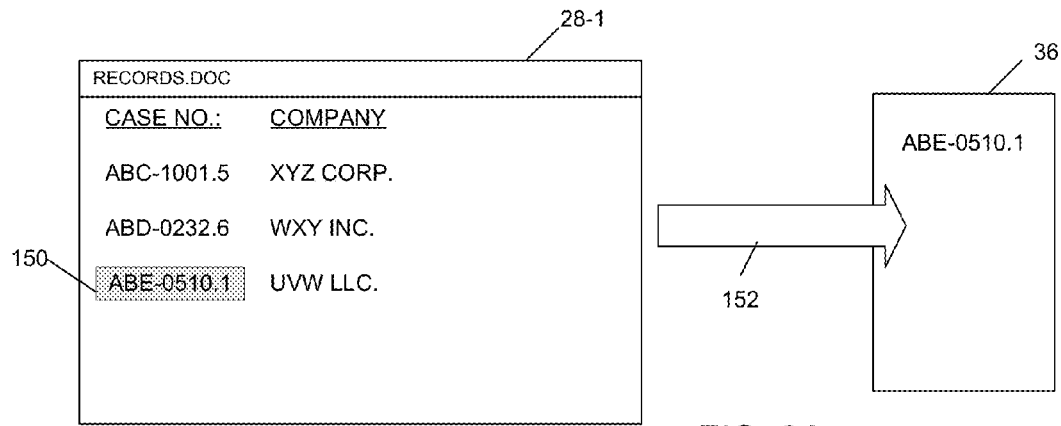
FIG. 3 is a block diagram illustrating an exemplary implementation of the process of FIG. 2.
Figure 3B:
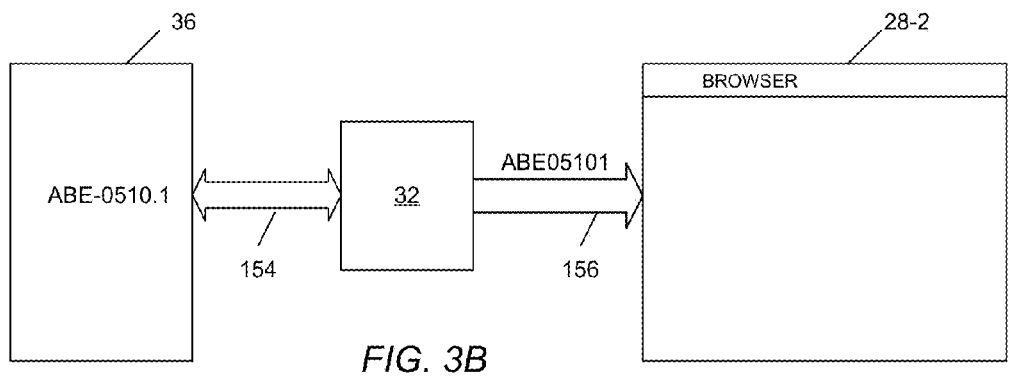
Figure 3C:
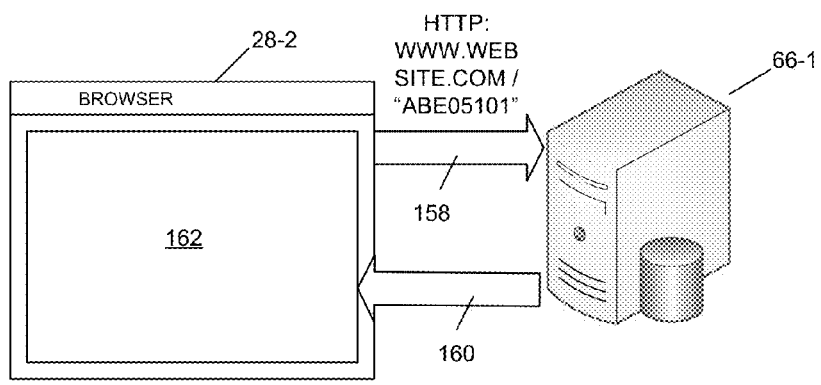

FIGS. 3A-3C illustrate the process 100 of FIG. 2 by example. Referring to FIG. 3A, the user is running a word processor application program 28-1. On the display monitor of the computing device appears a graphical window within which a document called "records.doc" is displayed. The document includes a table comprised of two columns of information. The first column lists case numbers and the second column lists company names. The user highlights a text portion 150 (here, case number "ABE-0510.1"), and causes the highlighted text portion 150 to be placed into the clipboard 36, as indicated by arrow 152.

Referring now to FIG. 3B, the data retriever program 32 reads the clipboard 36, as indicated by arrow 154 and finds the text portion "ABE-0510.1". After preprocessing a copy of the text portion, the data retriever program 32 produces a preprocessed candidate string of "ABE05101" (i.e., with the dash and decimal removed from the copy of the text portion). In this example, the preprocessed candidate string matches a test string associated with performing a web-based data query. Accordingly, the data retriever program 32 launches a browser application program 28-2, as shown by arrow 156.

Referring now to FIG. 3C, launch of the browser application program 28-2 includes an http: request directed to a specific web site on the Internet, as shown by arrow 158. The http: request includes a database query command and the preprocessed candidate string "ABE05101" as an input parameter for performing the database query at the web site. If the request contains sensitive information, such as a password, the communication can occur over a secure link (e.g., https:). A remote database server 66-1 receives the http: request, performs the database query, and returns the results (arrow 160) to the computing device. The results are displayed in the browser window 162 on the monitor of the computing device, preferably in a top layer or "pop-up" window that alerts the user that a data retrieval operation has occurred. Consequently, in accordance with the principles of the invention, a user of the computing device is able to retrieve data by the act of placing text onto the clipboard.

In the previous example, the data retriever program 32 causes the retrieval of data from a remote data store. Other embodiments of the invention can cause a data retrieval operation of a local data store. For example, consider a user of a hand-held device (e.g., a personal digital assistant or PDA) who is writing a memo. During the writing of the memo, the user records the name of an individual and wants to insert the person's phone number. The user can highlight the name of the person in the memo and copy the name to the clipboard of the PDA. For this example, consider that the data retriever program is customized to look for names and then to execute an application program that searches a "contacts" database, stored locally on the PDA, whenever a name is found (i.e., matches a test string). A contacts database keeps records of individuals, including information about their businesses, addresses, and business, mobile and home telephone numbers. By copying the name into the clipboard, the user causes a contacts record to appear in the display from which the user can obtain and place the desired information into the memo.

In a preferred embodiment, the user is unaware that the data retriever program 32 is running in the background. In another embodiment, the data retriever program 32 executes in the foreground and presents the user with a user interface. Through the user interface, a user can submit an identifier directly to the data retriever program 32. The data retriever program 32 attempts to match the user-submitted identifier with a test string and, upon finding a match, initiates a data-retrieval operation associated with the matched test string.

The present invention may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

Although the invention has been shown and described with reference to specific preferred embodiments, it should be understood by those skilled in the art that various changes in form and detail may be made therein without departing from the spirit and scope of the invention as defined by the following claims. For example, the invention has been described primarily with reference to a clipboard, which various operating systems use to facilitate the transfer of data from one application program to another. The invention may be practiced with a memory buffer other than the clipboard, provided multiple application programs can share access to that memory buffer and use the memory buffer to transfer data from one application program to another. As another example, various embodiments of the data retriever program have been described to launch an application program—for performing a data retrieval operation—when a candidate string matches a test string. It is to be understood that other embodiments of the data retrieval program can be designed to perform actions other than launching an application program, for example, terminating a process, issuing an operating system command, controlling hardware. Yet another example, the invention has been described primarily with reference to text as the type of data placed onto the clipboard and compared with test strings. Other embodiments of the data retriever program may be written to use other types of data (e.g., images).

What is claimed is:

1. A computer program product for retrieving information, the computer program product comprising:

a non-transitory computer readable storage medium having computer readable program code embodied therewith, the computer readable program code comprising:

computer readable program code configured to make a predetermined association between a test string and execution of an application program that performs a data-retrieval operation involving a search through a database of data records;

computer readable program code configured to automatically periodically read contents of a shared memory buffer to identify a candidate string being unmodified of new data written to the shared memory buffer;

computer readable program code configured to determine whether the unmodified candidate string written to the memory buffer satisfies the test string;

computer readable program code configured to launch execution of the application program to perform the data-retrieval operation in response to the unmodified candidate string written to the memory buffer satisfying the test string;

computer readable program code configured to generate a search term from the unmodified candidate string written to the shared memory buffer;

computer readable program code configured to pass the unmodified candidate string as the search term as an input parameter to the application program for use by the application program to perform the data-retrieval operation; and computer readable program code configured to present a data record retrieved from the database of data records in response to the execution of the application program.

2. The computer program product of claim 1, further comprising computer readable program code configured to retrieve a username and password for use in authenticating a user in order to perform the data-retrieval operation.

3. The computer program product of claim 1, wherein the shared memory buffer is a clipboard.

4. The computer program product of claim 1, further comprising computer readable program code configured to ignore the unmodified candidate string of new data written to the shared memory buffer if the unmodified candidate string does not satisfy the test string.

5. The computer program product of claim 1, wherein the computer readable program code configured to launch execution of the application program that performs a data-retrieval operation includes computer readable program code configured to execute a web browser, to retrieve a web page based on the unmodified candidate string of new data written to the shared memory buffer, and to display the retrieved web page.

6. The computer program product of claim 1, further comprising computer readable program code configured to make a predetermined association between each test string of a plurality of test strings and execution of one or more particular application programs of a plurality of application programs.

7. A computing system for retrieving information, comprising:

memory including a shared memory buffer, the memory storing computer readable program code corresponding to a data-retrieval program and computer readable program code corresponding to an application program that performs a search of a database of data records;

a processor running the data-retrieval program to make a predetermined association between a test string and execution of the application program that performs a search of a database, to automatically periodically read contents of the shared memory buffer to identify a candidate string being unmodified of new data written to the shared memory buffer, to determine whether the unmodified candidate string written to the memory buffer satisfies the test string, to launch execution of the application program that performs a search of a database of data records in response to the unmodified candidate string written to the memory buffer satisfying the test string, to generate a search term from the unmodified candidate string written to the shared memory buffer, to pass the unmodified candidate string as the search term as an input parameter to the application program for use by the application program to perform the search of the database, and to retrieve a data record from the database of data records in response to the execution of the application program.

8. The computing system of claim 7, wherein the processor, in response to the unmodified candidate string of new data written to the memory buffer satisfying the test string, is programmed to retrieve a username and password for use in authenticating a user in order to perform the data-retrieval operation.

9. The computing system of claim 7, wherein the shared memory buffer is a clipboard.

10. The computing system of claim 7, wherein the processor is programmed to ignore the unmodified candidate string written to the shared memory buffer if the unmodified candidate string does not satisfy the test string.

11. The computing system of claim 7, wherein execution of the application program launches a web browser, retrieves a web page based on the unmodified candidate string of new data written to the shared memory buffer, and displays the retrieved web page.

12. The computing system of claim 7, wherein the data-retrieval program makes a predetermined association between each test string of a plurality of test strings and execution of one or more particular application programs of a plurality of application programs.

13. A method for retrieving information, comprising:

making a predetermined association between a test string and execution of an application program that performs a data-retrieval operation involving a search through a database of data records;

automatically periodically reading contents of a shared memory buffer to identify a candidate string being unmodified of new data written to the shared memory buffer;

recognizing the unmodified candidate string written to the shared memory buffer;

determining whether the unmodified candidate string written to the memory buffer satisfies the test string;

launching execution of the application program that performs a data-retrieval operation in response to the unmodified candidate string written to the memory buffer satisfying the test string;

generating a search term from the unmodified candidate string written to the shared memory buffer;

passing the unmodified candidate string as the search term as an input parameter to the application program for use by the application program to perform the data-retrieval operation; and retrieving a data record from the database of data records in response to executing the application program that performs a data-retrieval operation.

14. The method of claim 13, further comprising retrieving a username and password for use in authenticating a user in order to perform the data-retrieval operation.

15. The method of claim 13, wherein the shared memory buffer is a clipboard.

16. The method of claim 13, further comprising ignoring the unmodified candidate string of new data written to the shared memory buffer if the unmodified candidate string does not satisfy the test string.

17. The method of claim 13, wherein launching execution of the application program includes launching a web browser, retrieving a web page based on the unmodified candidate string of new data written to the shared memory buffer, and displaying the retrieved web page.

18. A computer system, comprising:

means for making a predetermined association between a test string and execution of an application program that performs a data-retrieval operation involving a search through a database of data records;

means for automatically periodically reading contents of a shared memory buffer to identify a candidate string being non-modified of new data written to the shared memory buffer;

means for recognizing the unmodified candidate string of new data written to the shared memory buffer;

means for determining whether the unmodified candidate string of new data written to the memory buffer satisfies the test string;

means for launching execution of the application program to perform the data-retrieval operation in response to the unmodified candidate string written to the memory buffer satisfying the test string;

means for generating a search term from the unmodified candidate string written to the shared memory buffer;

means for passing the unmodified candidate string as the search term as an input parameter to the application program for use by the application program to perform the data-retrieval operation; and means for retrieving a data record from the database of data records in response to executing the application program that performs the data-retrieval operation.

19. The computer program product of claim 1, further comprising computer readable program code configured to automatically periodically read contents, at one second intervals, of a shared memory buffer to identify the candidate string of new data written to the shared memory buffer.

20. The computing system of claim 7, wherein the processor runs the data-retrieval program to automatically periodically read contents, at one second intervals, of the shared memory buffer to identify the unmodified candidate string of new data written to the shared memory buffer.

21. The method of claim 13, further comprising automatically periodically reading contents, at one second intervals, of the shared memory buffer to identify the unmodified candidate string of new data written to the shared memory buffer.

* * * * *